United States Patent [19]
Tripp

[11] 3,796,961
[45] Mar. 12, 1974

[54] PULSE TRAIN CONVERSION SYSTEM
[75] Inventor: Robert W. Tripp, Tuckahoe, N.Y.
[73] Assignee: Inductosyn Corporation, Valhalla, N.Y.
[22] Filed: Oct. 31, 1972
[21] Appl. No.: 302,541

Related U.S. Application Data
[62] Division of Ser. No. 117,582, Feb. 22, 1971, Pat. No. 3,725,654.

[52] U.S. Cl.................. 328/61, 328/63, 328/74
[51] Int. Cl..................... H03k 1/16, H03k 3/72
[58] Field of Search ............... 328/61, 62, 63, 74

[56] References Cited
UNITED STATES PATENTS
| | | | |
|---|---|---|---|
| 3,184,663 | 5/1965 | Mergler | 328/61 X |
| 3,069,608 | 12/1962 | Forrester et al. | 328/62 X |
| 3,355,642 | 11/1967 | Leenhouts | 328/62 X |

Primary Examiner—John Zazworsky
Attorney, Agent, or Firm—W. E. Beatty; Leonard Weiss

[57] ABSTRACT

A pulse train conversion system includes a binary counter having a plurality of stages which store a count, the count being advanced in response to a clock pulse. The counter stages are respectively connected to counter inputs of a logic circuit, digital value inputs of the logic circuit being connected to registers having a plurality of stages. The logic circuit provides an output pulse in response to the output of a particular stage of the counter being false and outputs of all stages of the counter of lesser significance than the particular stage being true concurrently with a stage of the register, corresponding to the particular stage of the counter, being true.

14 Claims, 3 Drawing Figures

Fig. 1

PULSE TRAIN CONVERSION SYSTEM

This is a division of application, Ser. No. 117,582, filed Feb. 22, 1971 now U.S. Pat. No 3,725,654.

BACKGROUND OF THE INVENTION

1. Field of the Invention.

The present invention relates to a pulse train conversion system which is useful in a machine tool contour control system, and more particularly to a system for directing the motion of a machine tool at a preselected, substantially constant speed along a straight line path defined by distance components parallel to a plurality of non-coincident axes.

2. Description of the Prior Art.

Prior art machine tool controls for machine tool movements at constant speed typically employ apparatus for generating command pulses for each of two orthogonal axes. Those orthogonal axes are typically designated X and Y axes. For movement only along one axis, for example the X axis, no pulses are generated along the Y-axis while one pulse per unit of distance to be moved is generated for the X axis.

Similarly, for movement only along the Y axis, no X axis command pulses are generated while the desired number of X axis pulses are generated. For movements other than along the X or along the Y axis, command pulses are generated both along the X and Y axes in proportion to the components of movement that each of the X and Y axes contribute to the resultant movement. For example, movement along an axis 45 degrees between the X and Y axes is achieved by an equal number of X and Y axes pulses. For movement along an axis having an angle closer to the X axis than the Y axis, the number of X axis command pulses generated is greater than the number of Y axis command pulses. Similarly, for movement along an axis closer to the Y axis, the number of Y axis command pulses generated is greatest.

In the prior art, the components of movement along the X axis and along the Y axis are designated by digital numbers. The magnitude of the resultant distance traveled is equal to the square-root of the sum of the squares of the X and Y components. The angle of movement is, of course, defined by the ratio of the X and Y components.

In addition to the digital numbers for the X and Y components, a digital number representing the rate of travel along the resultant path is typically employed. In order for the machine tool to travel at a programmed constant speed along the resultant path, independent of the direction and distance of travel, the rate of the command pulses generated for the X and Y axes must be varied as a function of the direction of travel.

Prior art systems have generally employed a source of clock pulses at a pre-programmed frequency for generating both the X axis and the Y axis command pulses. In order that the resultant speed of travel be constant regardless of the direction of travel (that is independent of the ratio of the X and Y commanded movement) the clock frequency is modified by a correction factor proportional to the square-root of the sum of the squares of the X and Y components.

Various prior art techniques are available for performing this modification of the clock frequency. In one technique, analog representations of the X and Y components are summed, squared and square-rooted to form a control signal for varying the frequency of a variable frequency oscillator.

Other prior art approaches employ digital techniques for summing, squaring and square-rooting the X and Y components in order to derive a correction factor. Still further, other prior art systems have employed various calculations which generate a correction factor closely approximating the square-root of the sum of the squares correction factor. For example, one approximation derives a correction factor proportional to the difference between the sum of the squares of the X and Y components with the square of the programmed rate. Other similar techniques for generating an approximate correction factor are known. While these techniques have been somewhat satisfactory, they have been slow in operation, incompatible with fully digital circuits, or expensive to implement.

In addition to the compensation factor employed for obtaining a constant resultant path rate of travel, prior art systems have employed interpolators for forming an approximately uniform distribution of the command pulses over the period during which the command motion is to be carried out. One such prior art interpolator comprises a chain of bistable elements driven by pulses of a fixed frequency. The stages of the bistable elements are inter-connected, in a manner conventional to digital counters, such that carry and non-carry pulses are generated from each stage where the carry pulses from each stage serve as the input to the next stage. By the selection of non-carry outputs from selected stages of the frequency divider, command pulses are gated onto a common line. The number of those command pulses is equal to the distance to be traveled along the respective axis and, further, they are approximately uniformly spaced over the time period of the command.

The fixed frequency supplied as an input to the interpolators of the previous paragraph are typically corrected by the length correction factor. The combination of the path length correction factor with the interpolator yields output pulses along the X and Y axes which are both evenly distributed over the command period and which result in constant machine tool motion. While combinations of path length compensators and interpolators are known, there is a need for improved devices having higher speeds, greater reliability and lower cost.

SUMMARY OF THE INVENTION

According to one aspect of the present invention, in response to evenly spaced clock pulses being received by a binary counter during a counter cycle, said counter provides a signal representation of the number of received pules to a comparator which has additionally provided thereto a signal representation of a digital value; in response to said clock pulses, said comparator provides selected clock pulses during said cycle thereby generating an output pulse train with an improved uniformity of spacing between said successive selected clock pulses, the number of said selected clock pulses during said cycle being equal to said digital value.

According to another aspect of the present invention, said comparator is comprised of a logic circuit stage connected to a stage of said counter; said logic circuit stage has a cascade input connected to a cascade output of a lower order logic circuit stage and has a cascade output connected to a cascade input of a higher order logic circuit stage.

BRIEF DESCRIPTION OF THE DRAWINGS

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein.

DESCRIPTION OF THE PREFERRED EMBODIMENT

The preferred embodiment described hereinafter may be used in the machine tool control system disclosed in U.S. Pat. No. 3,725,654 which is hereby incorporated herein and made a part hereof.

Figure 1:
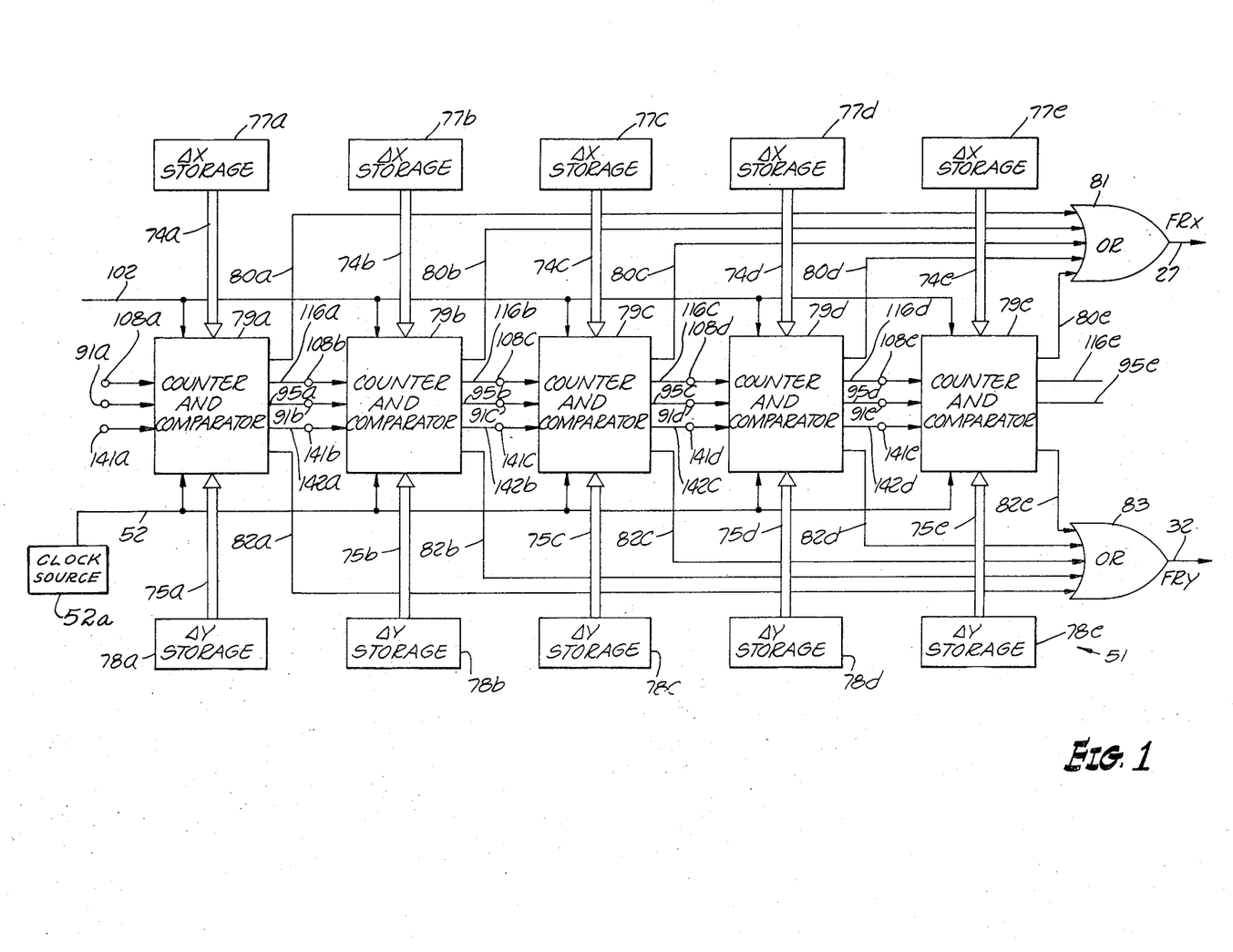
FIG. 1 is an electrical block diagram of the command pulse generator.
Figure 2:
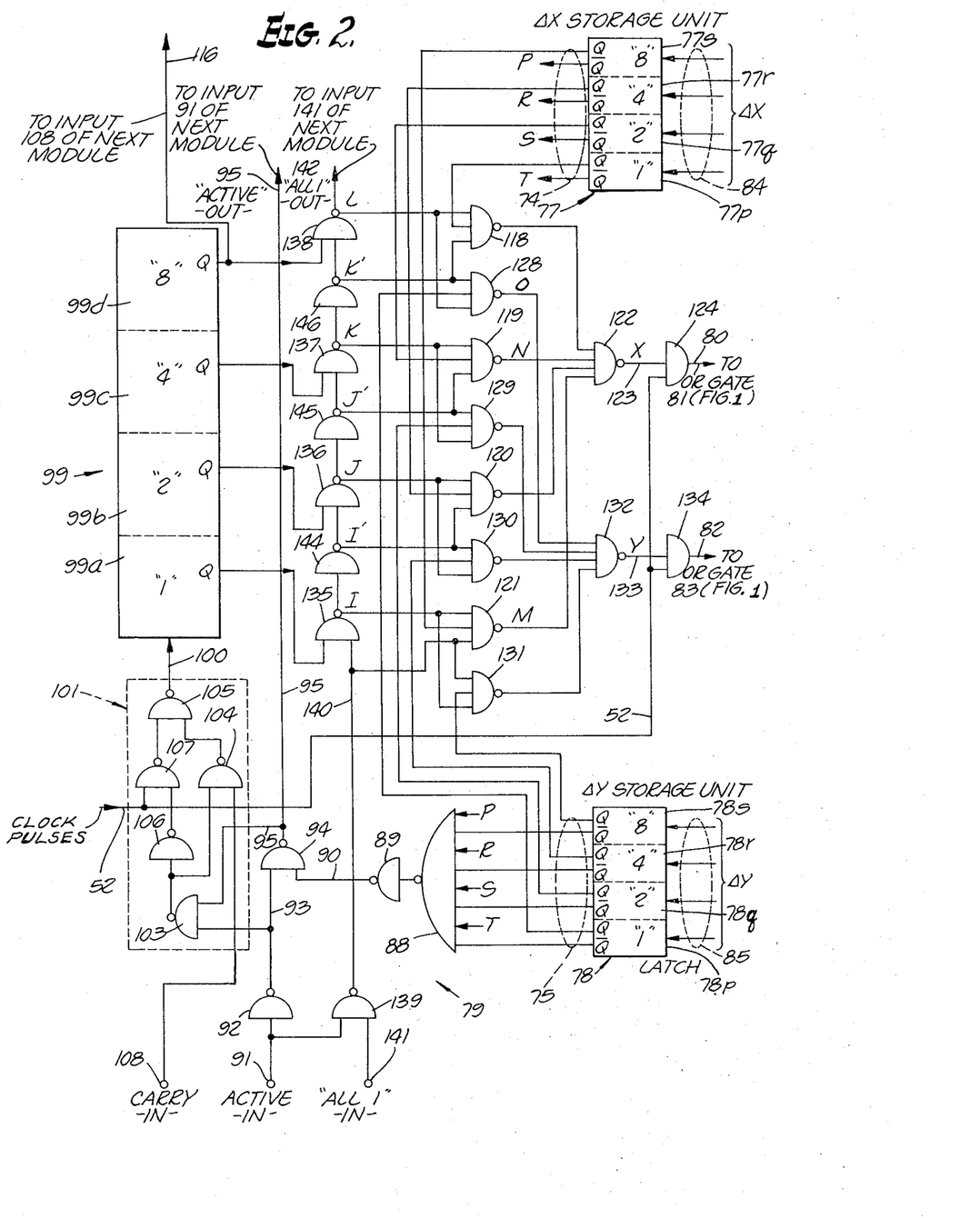
FIG. 2 is an electrical schematic diagram of a typical module of the command pulse generator of FIG. 1.

Referring now to FIG. 1, a command pulse generator 51, in the embodiment of is divided into five identical modules 76a, 76b, 76c, 76d and 76e. One such module is described in detail hereinbelow in conjunction with FIGS. 2 and 3. In FIG. 2, a typical module contains a four bit $\Delta X$ storage unit 77, a four bit $\Delta Y$ storage unit 78, and a counter and comparator unit 79. In FIG. 1, the $\Delta X$ storage units associated with modules 76a–76e respectively are designated 77a–77e. Similarly, the $\Delta Y$ storage units associated with modules 76a-76e respectively are designated 78a–78e and the counter and comparator units associated with modules 76a–76e respectively are designated 79a–79e. In FIG. 2, each of the units 77, 78 and 79 correspond to each of like-numbered units of FIG. 1 for each of the postscripts a through e. The storage units 77, 78 may store signal representations provided by a digital computer or any other suitable source.

Each of counter and comparator units 79a–79e (FIG. 6) functions to provide on a corresponding one of lines 80a–80e a number of command pulses determined by the contents of the corresponding $\Delta X$ storage unit 77a–77e. An OR gate 81 receives as inputs each of the lines 80a–80e and provides as an output on line 27 FRx command pulses which may, for example, be used to direct operation of X-axis drive means of a machine tool. Similarly, each of counter and comparator units 79a–79e functions to provide on a corresponding one of lines 82a–82e a number of command pulses determined by the content of the corresponding $\Delta Y$ storage unit 78a–78e. An OR gate 83 combines the outputs on each of lines 82a–82e and provides as an output on line 32 FRy command pulses, which may, for example be used to direct operation of Y-axis drive means of a machine tool.

Command pulse generator 51 includes means (described in conjunction with FIG. 2 below) for determining which one of modules 76a–76e is associated with the "first 1," that is, with the most significant "1" bit in either of the $\Delta X$ and $\Delta Y$ representations. This one module, herein called the "first active module," then receives clock pulses supplied on line 52. All command pulse generator 51 modules of greater significance than the first active module are inactive; the clock pulses automatically by-pass these inactive modules.

To illustrate the "zero by-pass" operation of command pulse generator 51, assume that $\Delta X$ and $\Delta Y$ have the values given in Example I below:

EXAMPLE I

"first 1"
↓
$X = 0000\ 0000\ 0000\ |1100|\ 0\ 1000 = 200\ FRx$ command pulses $= .02$ in.

$Y = 0000\ 0000\ 0000\ |0110|\ 0\ 0100 = 100\ FRy$ command pulses $= .01$ in.

Three digit group

In this example, $\Delta X$ is larger than $\Delta Y$, and the most significant "1" bit in $\Delta X$ (i.e., the "first 1") has the significance $2^7$. For Example I module 76d of command pulse generator 51 is the "first active module" and modules 76a, 76b, and 76c all are inactive. In this case, clock pulses supplied at any desired rate by a clock pulse source 52a on line 52 by-pass modules 76a, 76b, and 76c and are fed directly to first active module 76d.

TYPICAL COMMAND PULSE GENERATOR MODULE

Referring now to FIG. 2 a typical module 76 includes a counter and comparator 79, a $\Delta X$ storage unit 77 and a $\Delta Y$ storage unit 78. Each of modules 76a–76e (FIG. 1) is identical to module 76 shown in FIG. 2, differing only with respect to which bits of the $\Delta X$ and $\Delta Y$ representations are received by the module. Thus, e.g., should module 76 (FIG. 2) correspond to module 76d of FIG. 1, the four bits of $\Delta X$ information having significance $2^4$ through $2^7$ would be supplied by $\Delta X$ storage unit 77d. Similarly, the four bits of $\Delta Y$ information having significance $2^4$ through $2^7$ would be supplied by the $\Delta Y$ storage unit 78d.

Each $\Delta X$ storage unit 77 (FIG. 7) itself comprises four binary storage positions 77p, 77q, 77r and 77s, each of which may comprise a flip-flop having Q and $\overline{Q}$ outputs. Note that position 77p contains the least significant $\Delta X$ bit stored by unit 77. Thus, e.g., in module 76d storage position 77p would store the "$2^4$" bit of $\Delta X$, while storage position 77s would store the "$2^7$" bit of $\Delta X$. Note that the four storage positions 77p through 77s store binary bits having weighted values. The bit stored in position 77p has a significance ($2^4$), 77q a significance $2^5$, 77r a significance $2^6$, and 77s a significance $2^7$.

Similarly, ΔY storage unit 78 comprises for binary storage positions 78p–78s containing bits having weighted values. In module 76d, positions 78p through 78s store the ΔY bits having significances $2^4$ through $2^7$, respectively.

Referring still to FIG. 2, a pair of NAND gates 88 and 89 are used to recognize whether any one bits are stored in ΔX storage unit 77 or ΔY storage unit 78. To accomplish this, the $\overline{Q}$ outputs of the eight storage positions 77p–77s and 78p–78s comprise the inputs to eight-input NAND gate 88. Since the $\overline{Q}$ output of a particular storage position will be true only if a binary zero is stored in that position, all inputs in NAND gate 88 will be true, and hence the output of NAND gate 88 will be false, only if all storage positions 77p–77s and 78p–78s contain binary zeros. The output of NAND gate 88 is inverted by NAND gate 89, thereby supplying on a line 90 a signal which is true only if there are no binary ones stored in either ΔX storage unit 77 or ΔY storage unit 78. In a system controlling tool motion along more than two axes, line 90 would be connected to a corresponding one bit recognition circuit (not shown) for another axes.

Counter and comparator 79 includes an "active in" terminal 91 which receives an "active" signal from the preceding command pulse generator 51 module (i.e. the module of next higher significance in the modules of the group 76a to 76e). In the example where FIG. 2 represents module 76d, the next higher module is module 76c. This "active" signal is true only if the preceding module is active; otherwise, the "active" signal is false. The "active in" terminal 91a of module 76a always is false.

The "active" signal received at terminal 91 (see FIG. 7) is inverted by a NAND gate 92, to provide via a line 93 a first input to a NAND gate 94. NAND gate 94 also receives as an input the signal on line 90. Since the signal on line 93 is true only if the preceding module is inactive, and since the signal on line 90 is true only if no binary ones are contained in ΔX and ΔY storage units 77 and 78, the output of NAND gate 94 on a line 95 will be false only if the module shown itself is inactive. If the previous module of the group 76a to 76e is active, or if the previous module is inactive but at least one binary one is contained in ΔX storage unit 77 or ΔY storage unit 78 (i.e., if the illustrated module if the "first active" module), the output of NAND gate 94 will be true. Thus, the output of NAND gate 94, on a line 95, comprises the "active" signal which is fed to the "active in" terminal of the next module. For the example where FIG. 2 represents module 76(d) of FIG. 1, line 95 (FIG. 2) represents line 95d (FIG. 1) and is connected to input 91e (FIG. 1) of module 76(e) (FIG. 1).

For the ΔX and ΔY values given in Example I above, command pulse generator modules 76a, 76b and 76c (FIG. 1) are inactive, hence each of these will supply a false "active out" signal on lines 95a, 95b, 95c, respectively, corresponding to line 95 of FIG. 1. Module 76d will provide a true "active" signal to the "active in" terminal 91e of module 76e. A true "active" signal is produced by module 76e, but being the last module, there is no subsequent module to receive this signal and therefore that signal is not employed.

Still referring to FIG. 2, each counter and comparator unit 79 contains a binary counter 99 having four stages 99a, 99b, 99c and 99d, in order of increasing significance. Typically, counter 99 is advanced by the negative-going transition of count pulses supplied on a line 100 from a logic circuit 101. Thus, stage 99a changes stage once for each count pulse on line 100, stage 99b changes stage once for each two count pulses on line 100, stage 99c changes state once for each four count pulses on line 100, and stage 99d changes state once for each eight clock pulses on line 100. Correspondingly, stages 99a–99d are identified in FIG. 2 by the weighted values "1," "2," "4," and "8," respectively.

The source of count pulses on line 100 in a particular module of command pulse generator 51 depends on whether or not it is the first active module of the group 76a to 76e. In the first active module of that group, counter 99 receives clock pulses provided via line 52. If the preceding module also is active, counter 99 receives as count pulses the "carry" pulses from the preceding module at terminal 108. If the module is inactive, counter 99 receives no count pulses. The source of count pulses on line 100 is controlled by logic circuitry 101 in response to the state of the inverted "active in" signal on line 93 and the state of the "active out" signal on line 95 of the module containing counter 99.

Referring to FIG. 2, if the module illustrated is the first active module, the "active in" signal received at terminal 91 will be false, hence the signal on line 93 will be true. Moreover, the signal on line 90 will be true, since at least one binary 1 (i.e. the "first 1") will be present in either ΔX storage unit 77 or ΔY storage unit 78. In this instance, the "active out" signal on line 95 will be true. Since the signals on lines 93 and 95 provide inputs to NAND gate 103 in logic circuitry 101, the output of NAND gate 103 will be false. This false output provides an input to a NAND gate 104, thus the output of NAND gate 104 will be true regardless of the true or false level of the other input to NAND gate 104 from terminal 108, thereby providing a true or enabling input to a NAND gate 105, the output of which is connected to line 100. The false output from NAND gate 103 is inverted by a NAND gate 106 to provide a true or enabling input to a NAND gate 107. NAND gate 107 also receives as an input the clock pulses supplied via line 52. The clock pulses are inverted a first time by enabled NAND gate 107, and again inverted by enabled NAND gate 105. Thus, the clock pulses supplied via line 52 are provided on line 100 to counter 99.

In modules which are inactive, the signal on line 95 is false, hence causing the output of NAND gate 103 to remain true and the output of NAND gate 106 to remain false. The false output of NAND gate 106 inhibits NAND gate 107 from supplying clock pulses to NAND gate 105. Although the true output of NAND gate 103 enables NAND gate 104, no carry pulses are received from the preceding module (which also is inactive), hence no count pulses are supplied to NAND gate 105 or to counter 99.

Figure 3:
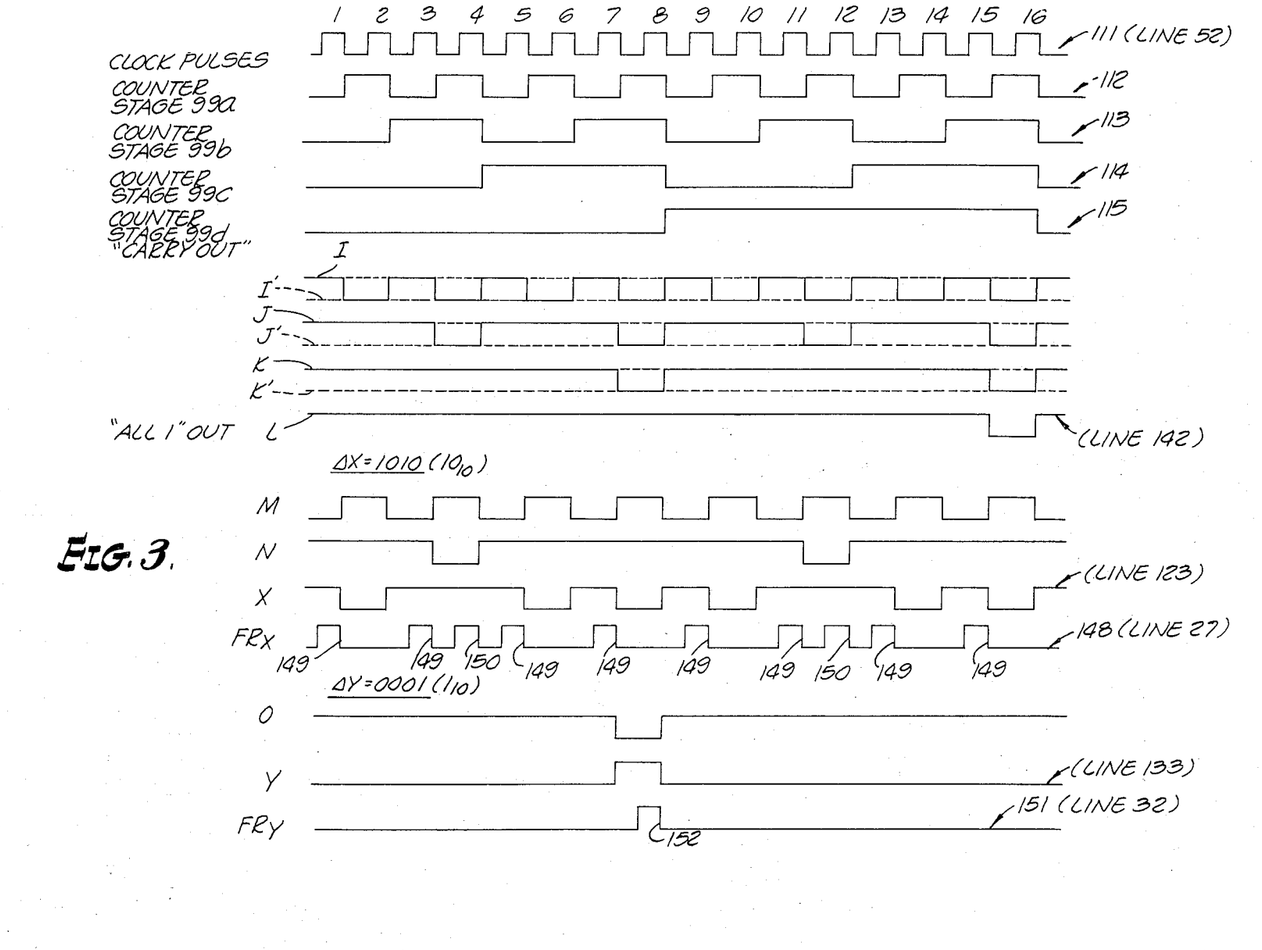
FIG. 3 is a set of waveforms of signals provided by a command pulse generator module of FIG. 2.

Waveforms illustrating operation of counter 99 are shown in FIG. 3. Referring thereto, waveform 111 represents the feed rate clock pulses present on line 52 and hence on line 100 of the first active module of command pulse generator 51. Note that the feed rate clock pulses shown in waveform 111 occur at a constant rate and have not been corrected in rate to compensate for the resultant path length of the cut being produced; the pulses are shown in this form in FIG. 8 to simplify the operational description of the module 76 shown in FIG. 7. Rate correction of the computed rate clock pulses is discussed in detail hereinbelow in conjunction with FIGS. 9–13.

Waveforms 112, 113, 114 and 115 (FIG. 8) respectively represent the states of stages 99a, 99b, 99c and 99d of counter 99 (FIG. 2). In the embodiment illustrated, counter stage 99a changes state upon occurrence of each negative going transition of the clock pulses (waveform 111). Similarly, each succeeding counter stage changes state upon occurrence of a negative-going transition of the preceding state. The "carry out" signal provided by module 76 on a line 116 (FIG. 2) corresponds to the state of stage 99d and thus also is illustrated by waveform 115. Note that the negative-going transition of this "carry out" signal (waveform 116) occurs at the trailing edge of the 16th feed rate clock pulse received on line 100; this negative-going transition serves to advance counter stage 99a in the next module of command pulse generator 51.

Recall that the function of command pulse generator 51 is to provide a set of FRx and FRy command pulses equal in number to the value of ΔX and ΔY representations stored in the ΔX and ΔY storage units 77 and 78 of the modules comprising generator 51. For each of modules 76a–76e, this function is accomplished by comparator logic generally indicated 117 (FIG. 7) in conjunction with counter 99 and ΔX and ΔY storage units 77 and 78.

Referring to FIG. 2, comparator 117 includes four NAND gates 118, 119, 120 and 121 each of which receives as one input the Q output from a corresponding one of storage positions 77p, 77q, 77r and 77s in ΔX storage unit 77. The outputs of NAND gates 118–121 provide the inputs to a NAND gate 122, the output of which provides via a line 123 one input to an AND gate 124.

Similarly, for the Y-axis, comparator 117 includes four NAND gates 128, 129, 130 and 131 each of which receives as one input the Q output from a corresponding one of storage positions 78p, 78q, 78r and 78s of ΔY storage unit 78. The outputs of NAND gates 128–131 provide the inputs to a NAND gate 132, the output of which provides, via a line 133, one input to an AND gate 134.

Comparator logic 117 further comprises four 2-input NAND gates 135, 136, 137 and 138, each of which receives as a first input a signal indicative of the contents of the corresponding counter stage 99a, 99b, 99c and 99d. As described below, the respective second input to each of NAND gates 135–138 is a signal which is true only when all preceding active counter stages are true.

As a second input, NAND gate 135 receives the output of a NAND gate 139 via a line 140. NAND gate 139 (FIG. 2) itself receives as a first input the "active in" signal from terminal 91. The second input to NAND gate 139 is an "all 1" signal from the preceding active module received via an "all 1" input terminal 141. In the first active module, the signal at "active in" terminal 91 will be false, thus the output from NAND gate 139 will be true. For other active modules, the "active in" signal will be true. This will enable NAND gate 139 to invert the "all 1" input signal received at terminal 141. As described below, the "all 1" input signal is false only when all counter stages of all preceding active modules are true, thus NAND gate 135 receives as its second input a signal which is true when all preceding active counter stages are true.

When the signal on line 140 is true, the output of NAND gate 135 comprises a signal I (illustrated by wave-form I in FIG. 3) which is the inverse of the contents of counter stage 99a (illustrated by waveform 112 in FIG. 3). This signal I is inverted by a NAND gate 144 to provide a signal I' (illustrated by waveform I' in FIG. 3) as one input of NAND gate 136. Comparison of waveform I' with waveform 112 indicates the two to be identical; that is the I' input to NAND gate 136 is true whenever counter state 99a is true.

The output of NAND gate 136 (FIG. 2) is a signal J (see waveform J in FIG. 8) which is false only when counter stages 99a and 99b both are true. Signal J is inverted by a NAND gate 145 to provide to NAND gate 137 a signal J' (see waveform J' in FIG. 3) which is true only when counter stages 99a and 99b both are true. When signal J' and the contents of counter stage 99c both are true, the output signal K (see waveform K in FIG. 3) from NAND gate 137 is false. This signal K is inverted by a NAND gate 146 to provide to NAND gate 138 signal K' (see waveform K' in FIG. 3) which is true only when counter stages 99a, 99b and 99c all are true.

NAND gate 138 produces on a line 142 an output signal L (see waveform L in FIG. 3) which is false only when counter stages 99a, 99b, 99c and 99d all are true. This signal L comprises the "all 1" output signal from the module illustrated, and is supplied to the "all 1" input terminal, like terminal 141 of FIG. 2, of the next module of command pulse generator 51. Moreover, the "all 1" out signal from last module 76e comprises the cycle complete signal on line 72 for command pulse generator 51.

In summary, the "all 1" signal on line 140 at the output of gate 139 (FIG. 2) is true if the module illustrated is the first active module of the group 76a to 76e (FIG. 1), or if all counter stages in all preceding active modules are set true. Each of signals I, J, K and L is false only when the corresponding counter stage 99a, 99b, 99c and 99d is true and all preceding active counter stages are true. Each of the signals I', J', and K' is true only when all active counter stages preceding the respective counter stages 99b, 99c and 99d are true. These various signals are used, in a manner described below, to enable gates 118–121 and 128–131 at times appropriate for generation of the FRx and FRy command pulses.

COMMAND PULSE GENERATION

Generation of command pulses by comparator logic 117 (FIG. 2) is illustrated in conjunction with FIG. 3 for the ΔX and ΔY values given by the following Example II:

EXAMPLE II

ΔX = $1010_2$ = ($10_{10}$) = contents of ΔX storage unit 77

ΔY = $0001_2$ = ($1_{10}$) = contents of ΔY storage unit 78

For this example ΔX storage unit 77 contains binary ones in storage positions 77q and 77s, and contains binary zeros in positions 77p and 77r. Similarly, Y storage unit 78 contains a binary one in position 78p and binary zeros in positions 78q, 78r and 78s. For simplicity of description, the corresponding waveforms of FIG. 3 assume that the first active module is illustrated.

For Example II, the contents of ΔX storage register 77 is such that NAND gates 119 and 121 are enabled. Storage positions 77p and 77r provide false inputs to NAND gates 118 and 120, causing the outputs of NAND gates 118 and 120 to remain true. NAND gate 121, which is enabled by the binary one contained in the storage position 77s of greatest significance in ΔX storage unit 77, also receives as inputs the I signal from NAND gate 135 and the true output from NAND gate 139. Thus, the output M (see waveform M of FIG. 3) of NAND gate 121 is a signal which is false each time counter stage 99a is false. NAND gate 119 is enabled by the binary one contained in storage position 77q and also receives as inputs the J' and K signals. Thus, NAND gate 119 produces an output signal N (see waveform N of FIG. 3) which is false each time counter stage 99c is false and counter stages 99a and 99b of lesser significance are true.

The outputs of NAND gates 118, 119, 120 and 121 provide the four inputs to NAND gate 122. For Example II, the outputs from NAND gates 118 and 120 remain true, hence whenever the output of either NAND gate 119 or 121 is false, the signal X (see waveform X in FIG. 3) obtained on line 123 at the output of NAND gate 122 is true. This signal X is combined with computed feed rate clock pulses on line 52 (see waveform 111 in FIG. 3) in AND gate 124 to provide ten X-axis command pulses on line 80 as represented by waveform 148 in FIG. 3. These command pulses on line 80 are supplied to FRx line 27 via OR gate 81 (FIG. 1).

Of the ten FRx pulses generated by logic 117 and represented by waveform 148, eight pulses (each designated 149 in FIG. 3) were enabled by the binary one bit contained in storage position 77s (having weighted value "8"), and two pulses (each designated 150 in FIG. 3) were enabled by the binary one bit contained in storage position 77q having weighted value "2." Note also that the weighted value "8" pulses 149 were gated by, and hence occurred in unison with clock pulses 1, 3, 5, 7, 9, 11, 13 and 15, as indicated by the corresponding ordinal identification above waveform 111 in FIG. 3. Similarly, the weighted value "2" pulses 150 were gated by computed feed rate clock pulses 4 and 12. Further note in FIG. 3 that the ten FRx command pulses represented by waveform 148 are appropriately uniformly spaced over the time period taken to supply 16 clock pulses to counter 99.

Operation of logic circuitry 117 for generation of the Y-axis command pulses specified by the ΔY value of Example II also is illustrated by the waveform of FIG. 3. Because a binary one is present only in storage position 78p of ΔY storage unit 78 (FIG. 2), NAND gates 129, 130 and 131 each receive false inputs from corresponding storage positions 78q, 78r and 78s. As a result, the outputs of NAND gates 129, 130 and 131 provide three true inputs to NAND gate 132.

The presence of a binary one in storage position 78p enables NAND gate 128, which gate also receives as inputs the signals K' and L. The K' signal is true only when all stages 99a, 99b and 99c of counter 99 are true. The L signal is true when counter stage 99d is false. Thus, the output signal 0 (see waveform 0 in FIG. 8) from NAND gate 128 is false only when counter stage 99d is false and all preceding counter stages are true.

The signal 0 is inverted by NAND gate 132 to provide on line 133 a signal Y (see waveform Y of FIG. 3) which provides one input to AND gate 134. The clock pulses on line 52 provide the other input to AND gate 134. The output of AND gate 134, on line 82, is represented by waveform 151 in FIG. 8 and comprises a single Y-axis command pulse 152 which occurs in uniform with the 8th clock pulse supplied via line 100 to counter 99.

Thus, in general, an X-axis command pulse is generated on line 80 each time the $i^{th}$ stage (as counted from the stage 99a of least significance) of counter 99 is false, and all active counter stages of lesser significance are true, and the contents of the corresponding $i^{th}$ storage position of ΔX storage unit 77, as counted from the storage position 77s of greatest significance, is true. Similarly, for the Y-axis, a command pulse is generated on line 82 each time the $i^{th}$ stage (as counted from stage 99a) of counter 99 is false, and all active counter stages of lesser significance are true, and the contents of the corresponding $i^{th}$ storage position of ΔY storage unit 78, is counted from the storage position 78s of greatest significance, is true.

In the embodiment of FIG. 1, command pulse generator 51 comprises five modules 76a–76e each of which includes four counter stages 99a–99d (FIG. 2). Thus, command pulse generator 51 may be characterized as including a counter of $N = 5 \times 4 = 20$ counter stages. From the above description, a binary one in the $j^{th}$ position of ΔX and ΔY, as counted from the position of least significance (i.e., from the position of significance $2^0$) will result in generation of $2^{j-1}$ command pulses for the corresponding axis. These $2^{j-1}$ command pulses will be enabled by the (N−J+1)th counter stage, as counted from the counter stage 99a of least significance in the first module 76a of command pulse generator 51. Since some modules may be inactive, if $n$ represents the number of active modules, then $M = 4n$ represents the number of active counter stages in command pulse generator 51. In this instance, the $2^{j-1}$ command pulses required by a binary one in the $j^{th}$ position of ΔX or ΔY will be enabled by the (M−j+1)th active counter stage, as counted from the counter stage 99a of least significance in the first active module.

By way of illustration, in Example I above, the binary one in position $j=8$ of ΔX and having significance $2^{j-1}=2^7$ will result in production of $2^7$ FRx command pulses by generator 51. These pulses will be enabled by the $(N=j-1) = (20-8-1) = 13^{th}$ counter stage of command pulse generator 51, that is, by counter stage 99a in the fourth module 76d. Since for Example I, module 76d is the first active module, and $n=2$ modules are active, the $2^7$ FRx command pulses will be enabled by the $(M-j+1)=(8-8+1)=1^{st}$ counter stage 99a in first active module 76d. Note that this binary one in position $j - 8$ of ΔX also is the "first 1," that is, the most significant "1" bit in the largest of ΔX and ΔY. Thus counter stage 99a in first active module 76d may be described as the first command pulse enabling counter stage in command pulse generator 51.

While the invention has been particularly shown and described with reference to preferred embodiments thereof, it will be understood by those skilled in the art that the foregoing and other changes in form and details may be made therein without departing from the

What is claimed is:

1. Apparatus for generating a plurality of output pulse trains, each train having a number of pulses equal to the value of corresponding one of a like plurality of digital inputs, the pulses of each train being approximately uniformly spaced over the same time period, said apparatus comprising:
   a source of clock pulses,
   a binary counter of M stages, said binary counter being advanced by said clock pulses,
   a like plurality of register means, each of said register means having M storage positions for storing in binary form a corresponding one of said plurality of digital inputs.
   a like plurality of comparator means, each of said comparator means cooperating with said binary counter and with an associated one of said register means for producing an output pulse each time the $i^{th}$ stage of said binary counter is false and all stages of lesser significance are true and the content of the $i^{th}$ storage position, as counted from the most significant storage position, of the associated register means is true and wherein $i$ is an integer between 1 and M.

2. Apparatus according to claim 1 wherein said output pulses further are gated by said clock pulses.

3. Apparatus according to claim 1 further comprising:
   means for providing an actuating signal for each stage of said binary counter indicating that all stages of lesser significance are set true,
   and wherein each of said comparator means comprises:
      M first gate means, each of said first gate means being enabled by a binary "1" bit in the corresponding $i^{th}$ storage position of said associated register means and responsive to the contents of the $i^{th}$ stage of said binary counter and to the actuating signal for that stage, for producing said output pulses.

4. Apparatus according to claim 3 further comprising:
   a like plurality of second gate means, each of said second gate means combining into one of a like plurality of output lines the output pulses from said M gate means.

5. Apparatus according to claim 4 further comprising means for gating the pulses on each of said output lines in response to occurrence of said clock pulses.

6. Apparatus according to claim 3 wherein said binary counter, said register means and said comparator means are arranged in modules of K stages each, where K is an integer less than M.

7. Apparatus according to claim 6 wherein M is a multiple of 4, and wherein $K=4$.

8. Apparatus according to claim 6 further comprising:
   detector means for determining which of said modules includes the register means storage position containing the binary "1" bit of most significance of the largest of said digital inputs, said module being designated the "first active" module.

9. Apparatus according to claim 8 further comprising:
   by-pass means, cooperating with said detector means, for providing said clock pulses directly to the binary counter stages of said "first active" module.

10. Apparatus for controlling the rate of generating pulses of the type having an operating binary counter and a register storing a signal representing a binary number, each storage position of said register corresponding to a bit of said counter contents, and wherein a comparator provides an output pulse each time a particular bit of said counter contents is a binary "0" and all bits of lesser significance are binary "1" and the storage position of said register corresponding to said particular bit contains a binary "1," comprising:
    means for determining for each output pulse the particular storage position of said register containing the binary "1" enabling production of that output pulse, and
    means responsive to each of said particular positions for changing the rate at which said counter operates.

11. A system according to claim 10 further comprising a source of clock pulses, and wherein said means comprises:
    a secondary binary counter, said first and second binary counters both being advanced by clock pulses from said source,
    decoding means for providing rate control signals when said output pulses occur in unison with selected bit combinations of the contents of said second binary counter, and
    means for changing the rate of said clock pulses in response to said rate control signals.

12. Apparatus for generating during a cycle of operation a number of pulses equal to a digital value comprising:
    a source of clock pulses;
    a binary counter connected to said clock source, said counter storing a count in a plurality of stages each of which has a known significance, said count being stepped by clock pulses cylically through a count range during said cycle of operation;
    an input source for providing a signal representation of a digital value; and
    a logic circuit connected to said counter, said clock and said input sources, said logic circuit providing a selected clock pulse at an output thereof in concurrent response to
    a signal provided by a particular stage,
    signals respectively provided by stages of lesser significance than said particular stage, and
    said input signals, said logic circuit providing selected clock pulses with a time distribution having a minimum deviation from a uniform distribution in response to said clock pulses being provided at a uniform rate during said cycle of operation.

13. The logic circuit of claim 12 wherein a logic circuit stage has a cascade input adapted for connection to a lower order logic circuit stage, a cascade output adapted for connection to a higher order logic circuit stage, a logic output connected to said pulse output, a digital value input connected to said input source and a counter input connected to a counter stage, said logic circuit stage comprising:
    means for providing a signal at said cascade output in concurrent response to signals being provided to said cascade and counter inputs; and
    means for providing one of said selected clock pulses at said logic output in concurrent response to a signal provided by said input source and signals respectively provided to said cascade and counter inputs of said logic circuit stage.

14. A pulse train conversion system including
a first digital means having a count contained in a plurality of active bits, the means generating a programmed signal at a first rate and including generating means operated by a control signal and in response to said first digital means for generating a number of connected pulses, the improvement comprising,
control means for generating said control signal so as to cause said generator means to generate command pulses at a rate altered by a correction factor so as to render said resultant rate substantially a constant independent of the counts in said first digital means, said control means including compensator means responsive to said command pulses and to at least some of said active bits for generating said correction factor, wherein said compensator means includes,
a first binary counter having N bits and operative to be stepped by said programmed signal,
a second counter having N bits for storing a binary number K,
a comparator connected to said first and second counters for generating an output, to form said control signal, each time the count in said first counter equals the value K stored in said second counter whereby said correction factor is proportional to K/N and said control signal has a rate K/N times said first rate.

* * * * *